Patented July 22, 1930

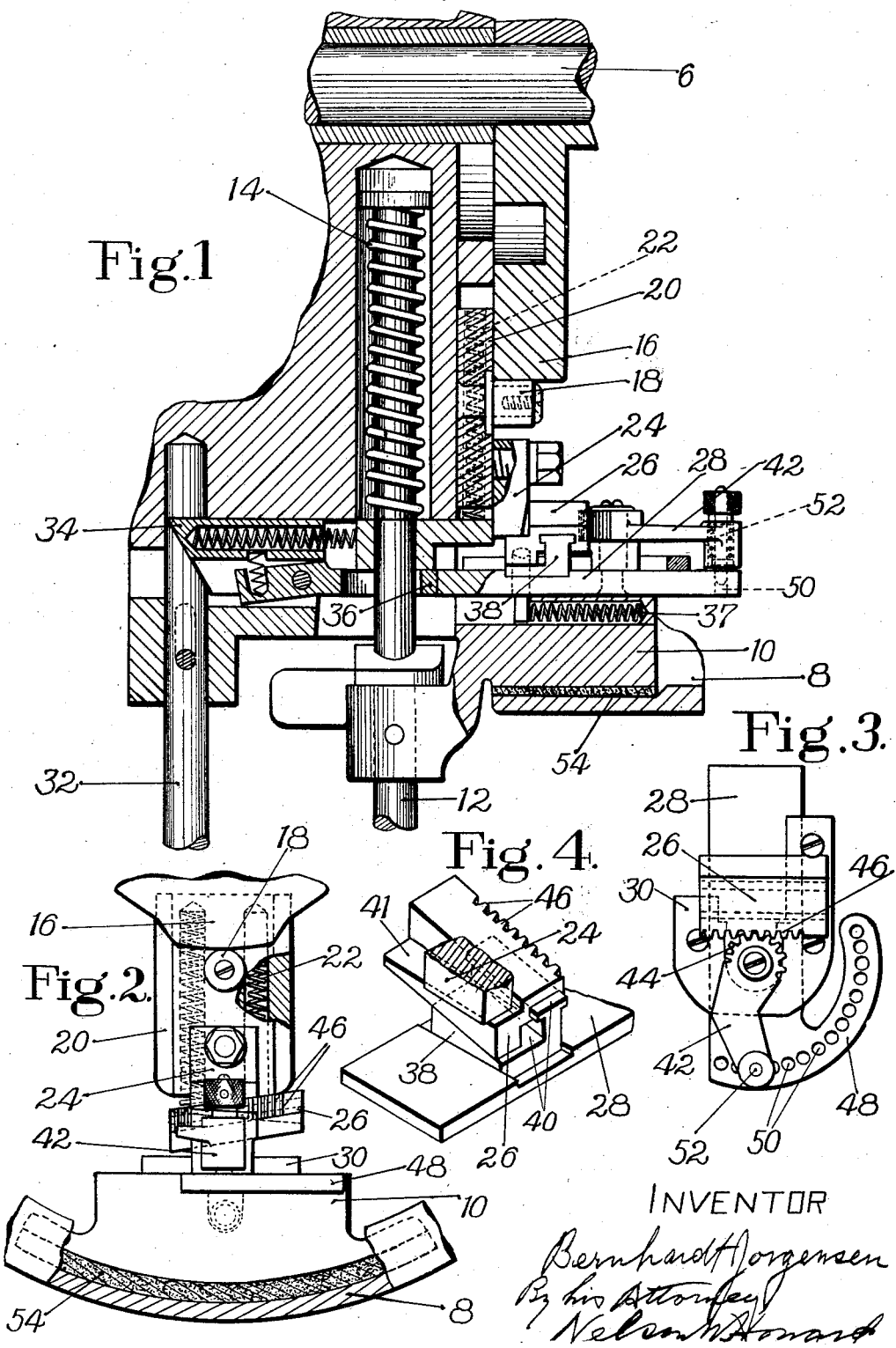

1,771,045

UNITED STATES PATENT OFFICE

BERNHARDT JORGENSEN, OF BEVERLY, MASSACHUSETTS, ASSIGNOR TO UNITED SHOE MACHINERY CORPORATION, OF PATERSON, NEW JERSEY, A CORPORATION OF NEW JERSEY

BRAKE MECHANISM

Application filed February 19, 1926. Serial No. 89,370.

This invention relates to brake mechanism, and is herein illustrated in its application to mechanism of the same general type as that shown and described in Letters Patent, No. 791,986 granted on June 6, 1905 upon an application of R. F. McFeely. It is to be understood, however, that the invention is not limited to mechanism of the particular type shown in that patent.

It is an object of the invention to provide simple and conveniently operable means for effecting quickly, whenever conditions require it, a definite and readily ascertainable amount of adjustment of brake mechanism to compensate for wear of the brake shoe. Mechanism of the type illustrated in the above-mentioned patent comprises a cam-controlled operating member having a fixed range of movement, and a brake shoe mounted independently of said member and operated thereby to stop the driven machine. For purposes of this invention the construction herein shown comprises a member mounted for adjusting movement in a direction transverse to the direction of movement of the operating member to compensate for wear of the brake shoe, this member as illustrated being carried by the brake shoe and arranged to act as a wedge between the brake shoe and the operating member to take up wear. The construction shown further comprises mechanism also carried by the brake shoe for adjusting the wedge member and for indicating the extent to which it has been adjusted.

The novel features of the invention will now be more particularly described by reference to the accompanying drawings and thereafter pointed out in the claims.

In the drawings,

Fig. 1 is a view in vertical section of starting and stopping mechanism of the type illustrated in the prior patent above mentioned, with the present invention embodied therein;

Fig. 2 is a right-hand side elevation of a portion of the structure shown in Fig. 1, with parts broken away;

Fig. 3 is a plan view of a portion of the structure shown in Fig. 1; and

Fig. 4 is a perspective view of a portion of the adjusting mechanism.

As more fully shown and described in the above-mentioned patent, starting and stopping mechanism of the type illustrated comprises means for imparting movement to a driven member, such as a cam shaft 6, through a driven element or pulley 8, a section only of which is shown in Fig. 1, connected by means of a clutch (not shown) to the source of power. To stop the machine there is provided by a brake shoe 10 for engaging the inner face of the pulley 8, the brake shoe being fast on a vertically movable rod 12 which is connected at its lower end to the clutch, so that when the rod is moved upwardly by a spring 14 the brake is released and the clutch is set to start the machine, and when the rod is moved downwardly against the resistance of the spring 14 the clutch is released and the brake shoe is applied to the pulley to stop the machine. The downward movement of the rod 12 and the brake shoe is effected by a peripheral cam 16 on the shaft 6 which engages a roll 18 fast on a vertically movable operating member or slide 20 pressed upwardly by springs 22. The slide 20 has fast thereon a lug 24 in position to engage an abutment member 26 which is carried by the brake shoe 10, so that the latter is moved downwardly by the slide 20. The member 26 is mounted, as more particularly hereinafter described, on a horizontal slide 28 which is positioned under a cap plate 30 on the brake shoe 10. To start the machine, the slide 28 is moved to the right (Fig. 1) far enough to release the member 26 from the lug 24, thus releasing the brake shoe and the rod 12 to permit them to be moved upwardly by the spring 14, as above described. Such movement is imparted to the slide 28 by means of a treadle-operated rod 32 the upper end of which is in wedging engagement with a horizontally-movable slide 34 which carries a member 36 in engagement with the left-hand end of the slide 28. In the course of the cycle of operations of the machine the cam 16 arrives in position to permit the slide 20 to be moved upwardly by its springs 22 far enough to permit the member 26 to be again moved under the lug 24 by the action of a spring 37 upon the slide 28. Thereafter the slide 20 is again moved downwardly by the cam 16 to depress the brake shoe and release the clutch.

For purposes of the present invention the member 26 is shaped to serve as a wedge member adjustable to vary the relation of the brake shoe 10 to its operating member 20. As shown more particularly in Figs. 2 and 4, the wedge-shaped member 26 is slidingly mounted upon a member 38 which is fast on the slide 28, the member 38 being shaped to provide a smooth guideway 40 for the member 26 which is inclined relatively to the direction of movement of the slide 20. It will thus be seen that in its movement along the guideway 40 the member 26 acts as a wedge between the lug 24 and the slide 28, either to force the brake shoe 10 farther downwardly relatively to the slide 20, or to permit it to be moved upwardly in relation to the slide, the parts being so shaped and arranged that the surface 41 on the member 26, which engages the lug 24, is substantially perpendicular to the direction of movement of the slide 20.

For controlling the member 26 there is provided an arm 42 pivotally mounted on the slide 28 and provided with gear teeth 44 in engagement with rack teeth 46 formed on one side of the member 26. By reference to Fig. 2 it will be seen that the rack teeth 46 are vertically arranged, to engage the correspondingly arranged gear teeth 44. For retaining the arm 42 in adjusted position there is provided on the slide 28 a segment 48 having therein a series of holes 50 to receive a spring-controlled pin 52 mounted in the outer end of the arm 42. By the use of this mechanism the brake may be conveniently and quickly adjusted at any time when conditions indicate that adjustment is necessary. It is customary to provide the brake shoe 10 with a leather facing 54 which may be replaced when worn out. In addition to other advantages, the arm 42 serves to show by its position how much adjustment has been made to compensate for wear of the brake shoe and therefore to indicate when replacement of the leather facing is necessary.

Having described the invention, what I claim as new and desire to secure by Letters Patent of the United States is:—

1. In mechanism of the class described, the combination with a driven element, of a normally stationary brake shoe operatively movable toward said driven element to stop the movement of said element, a member movably mounted independently of said brake shoe for operating it, a wedge member carried by the brake shoe for transmitting movement from the operating member to the brake shoe and adjustable to vary the relation between the brake shoe and said operating member, and a device for imparting adjusting movement to said wedge member.

2. In mechanism of the class described, the combination with a driven element, of a brake shoe operatively movable toward said driven element to stop the movement of said element, an operating member movably mounted independently of the brake shoe, an abutment member carried by the brake shoe and arranged to be engaged by said operating member, a smooth guideway along which said abutment member is adjustable in a direction transverse to the direction of movement of said operating member to vary the relation between the brake shoe and the operating member, and a device for locking said abutment member in adjusted position.

3. In mechanism of the class described, the combination with a driven element, of a brake shoe for engaging said driven element, a cam having a fixed throw for operating said brake shoe, and power-transmitting mechanism between said cam and the brake shoe comprising a slide and a wedge member on the brake shoe operated by said slide and mounted for rectilinear adjustment in a direction transverse to the direction of movement of the slide to vary the pressure applied by the brake shoe.

4. In mechanism of the class described, the combination with a driven element, of a brake shoe operatively movable toward said driven element, a member for operating said brake shoe, power-transmitting mechanism between said member and the brake shoe comprising a member mounted for rectilinear adjustment in a direction transverse to the direction of the movement of the brake shoe to vary the pressure applied by the brake shoe and a device rotatable to adjust said last-named member.

5. In mechanism of the class described, the combination with a driven element, of a brake shoe for engaging said driven element, means for operating said brake shoe including a member mounted for adjustment to compensate for wear of the brake shoe, said member having rack teeth thereon, a gear member engaging said rack teeth, an arm for operating said gear member, and means for retaining said arm in any one of a series of adjusted positions.

6. In mechanism of the class described, the combination with a driven element, of a brake shoe operatively movable toward said driven element, an operating member, means for transmitting movement from said operating member to the brake shoe including a wedge member carried by the brake shoe and mounted for adjustment to vary the pressure applied by the brake shoe, and means on the brake shoe geared to said wedge member for adjusting it.

7. In mechanism of the class described, the combination with a driven element, of a brake shoe operatively movable toward said driven element, an operating member, means for transmitting movement from said operating member to the brake shoe including a member carried by the brake shoe and adjustable to compensate for wear of said shoe, a device for adjusting said member, and means also carried by the brake shoe for indicating by the position of said device the condition of the shoe in respect to wear.

8. In mechanism of the class described, the combination with a driven element, of a brake shoe operatively movable toward said driven element, an operating member, means for transmitting movement from said operating member to the brake shoe including a wedge member carried by the brake shoe and adjustable to compensate for wear of said brake shoe, an arm also carried by the brake shoe for adjusting said wedge member, and means on the brake shoe for retaining said arm in any one of a series of adjusted positions and for indicating by the position of the arm the condition of the brake shoe in respect to wear.

9. In mechanism of the class described, the combination with a driven element, of a brake shoe movable toward and from said driven element and having a slide mounted thereon, an operating member, and a member on said slide arranged to be engaged by said operating member to transmit operative movement to the brake shoe and to be released from said operating member by movement of the slide relatively to the brake shoe, said member on the slide being adjustable in a direction transverse to the direction of the movement of the brake shoe to vary the pressure applied by the brake shoe.

In testimony whereof I have signed my name to this application.

BERNHARDT JORGENSEN.